US005899661A

United States Patent [19]

Sishtla et al.

[11] Patent Number: 5,899,661

[45] Date of Patent: May 4, 1999

[54] AXIAL RESTRAINT SYSTEM FOR VARIABLE PIPE DIFFUSER

[75] Inventors: Vishnu M. Sishtla, Cicero; Thomas M. Zinsmeyer, Pennellville, both of N.Y.

[73] Assignee: Carrier Corporation, Syracuse, N.Y.

[21] Appl. No.: 08/907,243

[22] Filed: Aug. 6, 1997

[51] Int. Cl.[6] .............................. F01B 21/02; F16C 23/00

[52] U.S. Cl. ........................... 415/150; 384/249; 415/166

[58] Field of Search ..................................... 415/150, 151, 415/157, 165, 166, 167; 384/249, 303

[56] References Cited

U.S. PATENT DOCUMENTS

| | | | |
|---|---|---|---|
| 214,813 | 4/1879 | Clime | 415/166 |
| 274,884 | 3/1883 | Burnham | 415/166 |
| 293,238 | 2/1884 | Flenniken et al. | 415/166 |
| 295,590 | 3/1884 | Sherck | 415/166 |
| 2,996,996 | 1/1961 | Jassniker . | |
| 3,362,625 | 1/1968 | Endress . | |
| 4,030,787 | 6/1977 | Brogan et al. | 384/249 |
| 4,070,123 | 1/1978 | Willingshofer et al. . | |
| 4,378,194 | 3/1983 | Bandukwalla | 415/158 X |
| 4,544,325 | 10/1985 | Rogo et al. | 415/150 |
| 4,829,860 | 5/1989 | Vander Pol | 384/249 X |
| 5,387,080 | 2/1995 | Bouhennicha et al. | 415/150 |
| 5,807,071 | 9/1998 | Brasz et al. | 415/150 |

*Primary Examiner*—John E. Ryznic

[57] ABSTRACT

An axial restraint system for use in a variable pipe diffuser having an inner ring rotatably positioned within an outer ring. The axial restraint system includes a housing fixedly mounted to the outer ring and having a mounting hole disposed therein in perpendicular arrangement to the inner ring. A shaft having a first end and a second end and having a bearing pad mounted to the first end. The second end of the shaft is threadably engaged within the mounting hole and rotatably operable to effect an adjustment of the position of the bearing pad. The shaft is positioned such that the bearing pad contacts the inner ring and thereby limits the axial movement of the inner ring relative to the outer ring.

7 Claims, 8 Drawing Sheets

AXIAL RESTRAINT SYSTEM FOR VARIABLE PIPE DIFFUSER

BACKGROUND OF THE INVENTION

1. Field of the Invention

The present invention relates to centrifugal compressors in general and in particular to a axial restraint system for the inner ring of a variable pipe diffuser.

2. Background of the Prior Art

One of the major problems arising in the use of centrifugal vapor compressors for applications where the compressor load varies over a wide range is flow stabilization through the compressor. The compressor inlet, impeller and diffuser passages must be sized to provide for the maximum volumetric flow rate desired. When there is a low volumetric flow rate through such a compressor, the flow becomes unstable. As the volumetric flow rate is decreased from a stable range, a range of slightly unstable flow is entered. In this range, there appears to be a partial reversal of flow in the diffuser passage, creating noises and lowering the compressor efficiency. Below this range, the compressor enters what is known as surge, wherein there are periodic complete flow reversals in the diffuser passage, destroying the efficiency of the machine and endangering the integrity of the machine elements. Since a wide range of volumetric flow rates is desirable in many compressor applications, numerous modifications have been suggested to improve flow stability at low volumetric flow rates.

Many schemes have been devised to maintain high machine efficiencies over a wide operation range. In U.S. Pat. No. 4,070,123, the entire impeller wheel configuration is varied in response to load changes in an effort to match the machine performance with the changing load demands. Adjustable diffuser flow restrictors are also described in U.S. Pat. No. 3,362,625 which serve to regulate the flow within the diffuser in an effort to improve stability at low volumetric flow rates.

A common technique for maintaining high operating efficiency over a wide flow range in a centrifugal machine is through use of the variable width diffuser in conjunction with fixed diffuser guide vanes.

U.S. Pat. Nos. 2,996,996 and 4,378,194, issued to a common assignee, describe variable width vaned diffusers wherein the diffuser vanes are securely affixed, as by bolting to one of the diffuser walls. The vanes are adapted to pass through openings formed in the other wall thus permitting the geometry of the diffuser to be changed in response to changing load conditions.

Fixedly mounting the diffuser blades to one of the diffuser walls presents a number of problems particularly in regard to the manufacture, maintenance and operation of the machine. Little space is afforded for securing the vanes in the assembly. Any misalignment of the vanes will cause the vane to bind or rub against the opposite wall as it is repositioned. Similarly, if one or more vanes in the series has to be replaced in the assembly, the entire machine generally has to be taken apart in order to effect the replacement.

The efficiency of a compressor could be greatly enhanced by varying the outlet geometry of the diffuser. In U.S. patent application Ser. No. 08/658801, commonly assigned, a variable geometry pipe diffuser is disclosed. That application is hereby incorporated by reference. A variable geometry pipe diffuser (which may also be termed a split-ring pipe diffuser) splits the diffuser into a first, inner ring and a second outer ring. The inner and outer rings have complementary inlet flow channel sections formed therein. That is, each inlet flow channel section of the inner ring has a complementary inlet flow channel section formed in the outer ring. The inner ring and outer ring are rotatable respective one another. The rings are rotated to improve efficiency for varying pressure levels between a fully open position and a partially closed position. In the partially closed position the misalignment of the exit pipes of the diffuser causes an increase in noise. Rotation of the rings past an optimum design point results in excessive noise and efficiency degradation.

The geometrical tolerances within a centrifugal compressor are small. At the same time the loads within the compressor are large and dynamic in nature. In a split ring pipe diffuser the problem of maintaining tolerances in the face of the dynamic loading becomes quite onerous. There are both axial (thrust) loads and circumferential loads on the ring pair that need to be managed. The diffuser rings must be able to rotate relative to one another and at the same time tight control over their relative position must be maintained in order to ensure proper alignment of the flow channels and the ultimate efficiency of the compressor. The cost of maintaining the necessary tolerances in a split ring diffuser is generally very high.

Another problem with split ring diffusers is premature part wear. Lubricants are generally not used within the gas flow regions of centrifugal compressors to preclude contamination of the gases. The dynamic loads imposed upon the split ring diffuser by the gas flow exiting the impeller cause wear in the components of the diffuser to be accelerated by the absence of lubricating oil.

The drive system for accurately positioning the rings relative to one another must, among other things, be rigid to avoid any fretting of components. Because of circumferential loading on the rings there is a propensity for the inner ring to oscillate relative to the outer ring which could cause compressor instability, part wear and could adversely affect efficiency. This causes several problems that need to be overcome. A drive system is needed that is capable of preventing the relative movement between the inner and outer rings. A bearing concept is also needed which would allow for the relative rotation of the two rings and also be capable of withstanding the circumferential and thrust loads while maintaining tight geometric tolerances between the rings. There is also a need to provide a positioning system that includes positive minimum and maximum stops to avoid unnecessary noise and efficiency degradation as well as simple field retrofit. In addition, there is a need for the drive and bearing systems have a long operating life and be easy to install and adjust properly.

SUMMARY OF THE INVENTION

According to its major aspects and broadly stated, the present invention relates to a variable geometry pipe diffuser for a centrifugal compressor. More specifically the present invention relates to a support mechanism of an inner ring for use in a variable geometry pipe diffuser for a centrifugal compressor.

Bearing pads limit the axial movement of the inner ring relative to the outer ring in a split ring diffuser of the present invention. The axial restrain system of the present invention includes a bearing pad mounted to the end of a shaft. The other end of the shaft is threadably engaged in the housing of the compressor. With the inner ring of the diffuser installed the shaft is rotatably operable to cause the bearing pad to come into contact with the inner ring and to thusly limit the axial movement of the inner ring. In the axial restraint system of the present invention it is possible to adjust the contact between the bearing pad and the inner ring to prevent movement of the inner ring relative to the out ring. In addition an embodiment of the present invention provides for a lock nut to releasably secure the position of the shaft at a selected adjustment position.

BRIEF DESCRIPTION OF THE DRAWINGS

In the drawings, wherein like numerals are used to indicate the same elements throughout the views.

DETAILED DESCRIPTION OF THE PREFERRED EMBODIMENTS

Figure 1:
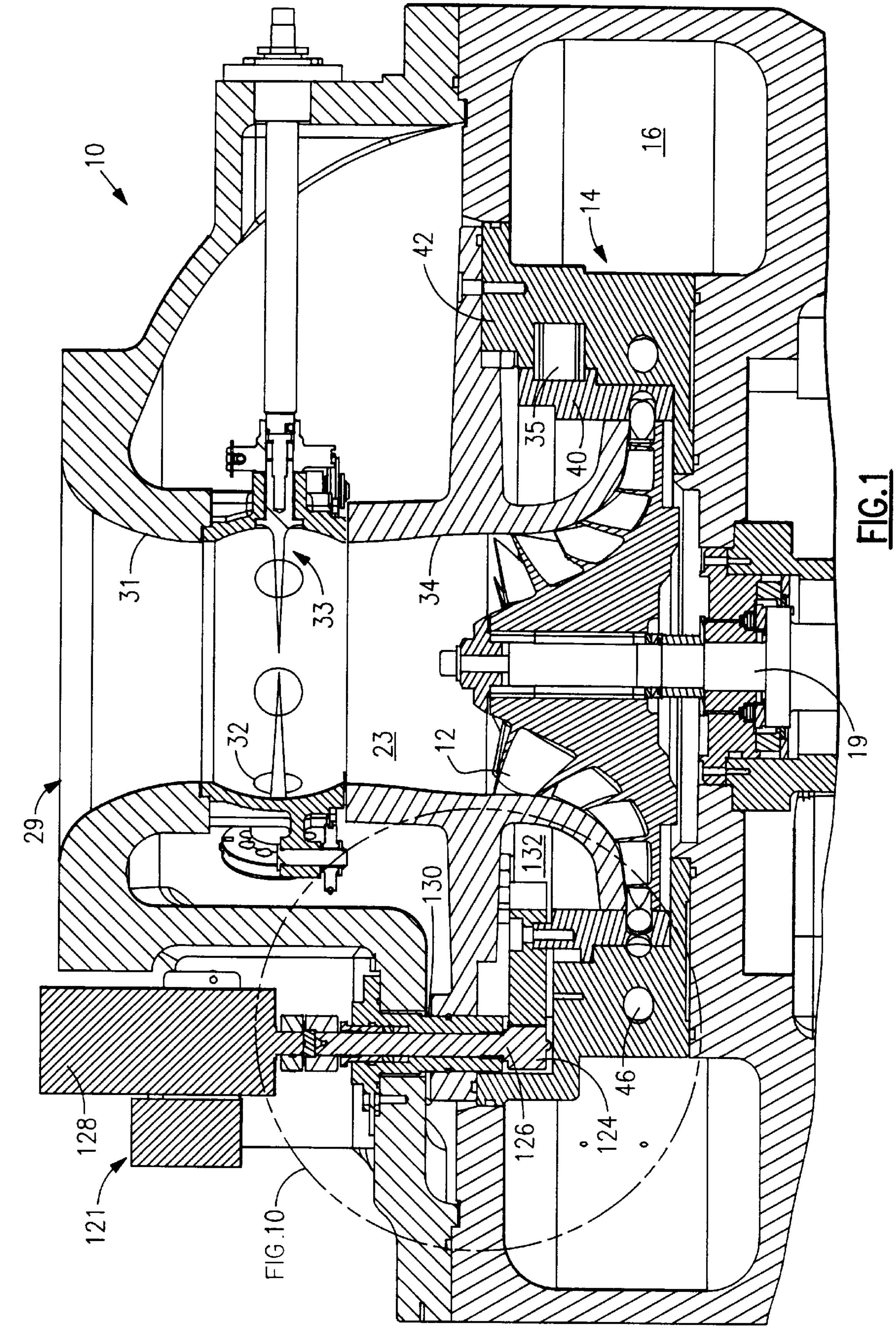
FIG. 1 is a cross-section side view of compressor according to the invention having a variable pipe diffuser according to the present invention.

Referring now to FIG. 1, the invention is shown as installed in a centrifugal compressor 10 as part of an HVAC system (not shown) having an impeller 12 for accelerating refrigerant vapor to a high velocity, a diffuser 14 for decelerating the refrigerant to a low velocity while converting kinetic energy to pressure energy, and a discharge plenum in the form of a collector 16 to collect the discharge vapor for subsequent flow to a condenser. Power to the impeller 12 is provided by an electric motor (not shown) which is hermetically sealed in the other end of the compressor and which operates to rotate a high speed shaft 19.

Referring now to the manner in which the refrigerant flow occurs in the compressor 10, the refrigerant enters the inlet opening 29 of the suction housing 31, passes through the blade ring assembly 32 and the guide vanes 33, and then enters the compression suction area 23 which leads to the compression area defined on its inner side by the impeller 12 and on its outer side by the housing 34. After compression, the refrigerant then flows into the diffuser 14, the collector 16 and the discharge line (not shown).

Figure 3:
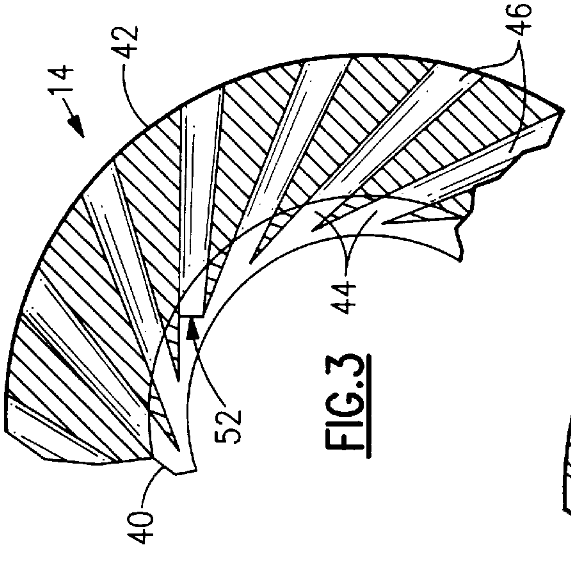
FIGS. 3 and 4 are cross-sectional front views of a variable pipe diffuser in accordance with the invention in a first, fully open, and a second, partially closed position, respectively.
Figure 4:
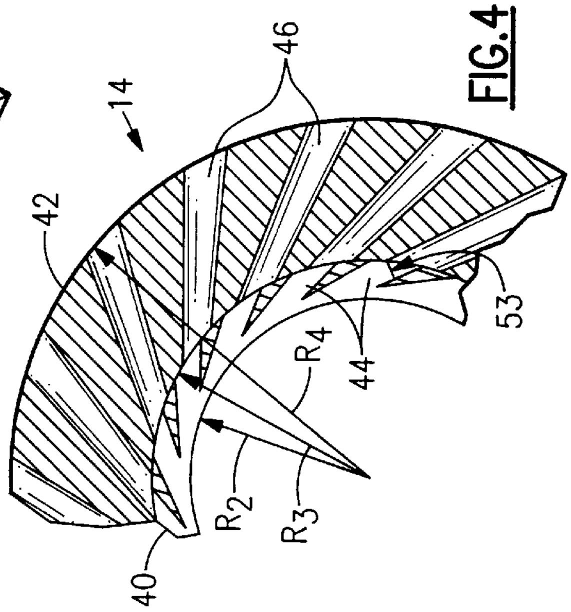
Figure 2:
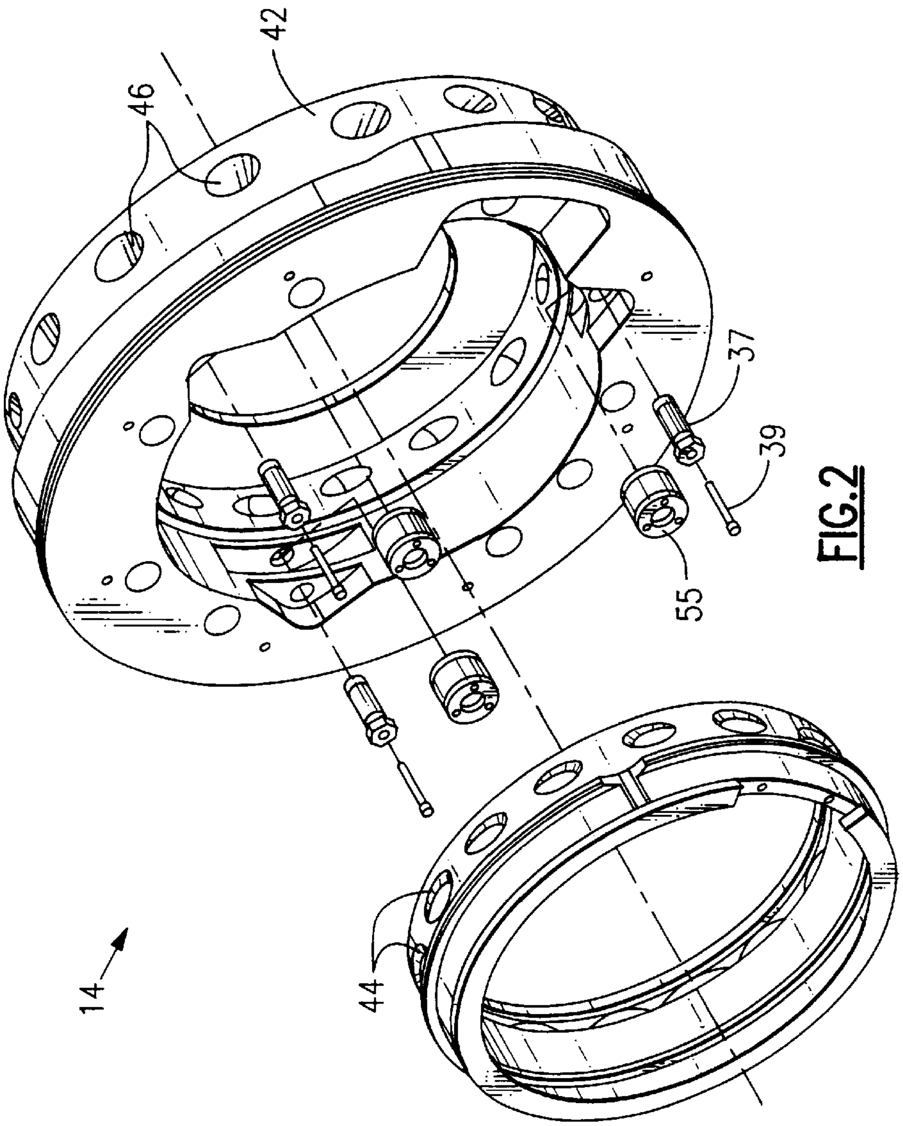
FIG. 2 is a perspective view of a variable pipe diffuser according to the invention.

A variable geometry pipe diffuser 14 according to the present invention includes a first, inner ring 40 and a second outer ring 42, a ring support mechanism 35, and a positioning drive mechanism 121. Referring to FIGS. 3 and 4 the inner and outer rings have complementary flow channel sections 44 and 46 formed therein. That is, each flow channel section 44 of the inner ring 40 has a complementary channel section 46 formed in outer ring 42. Inner ring 40 and outer ring 42 are rotatable with respect to one another. In a preferred embodiment, inner ring 40 rotates circumferentially within a stationary outer ring 42.

When one ring is rotated with respect to the other, the alignment between each pair of complementary inlet flow channels of the inner and outer rings changes as seen with reference to FIGS. 3 and 4. Rings 40 and 42 are adjustable between a first fully open position, as illustrated in FIG. 3, wherein complementary channel sections are aligned and a maximum amount of fluid passes through inner and outer rings 40 and 42, and a second, partially closed position, as illustrated in FIG. 4, wherein complementary channels are misaligned and flow through the channel sections 44 and 46 is restricted.

Figure 6:
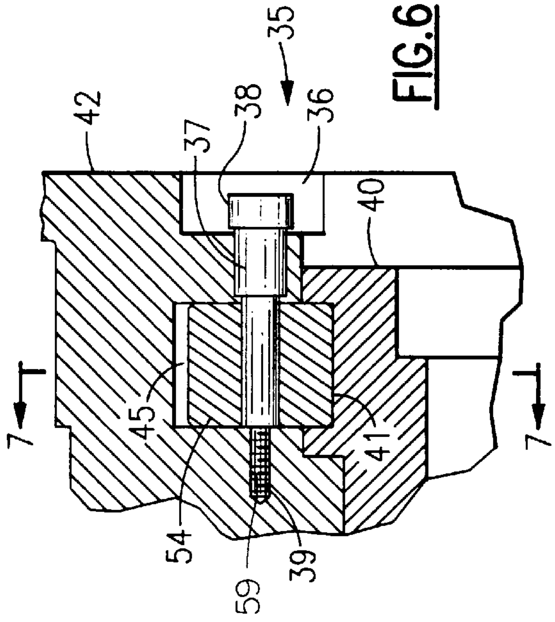
FIG. 6 is a cross section view of a ring support mechanism of the present invention taken substantially along line 6—6 in FIG. 5.
Figure 7:
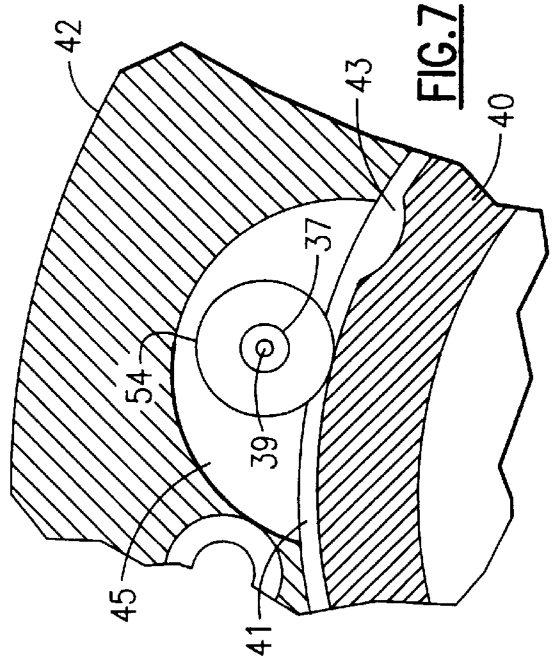
FIG. 7 is a cross section view of a ring support mechanism of the present invention taken substantially along line 7—7 in FIG. 6.
Figure 5:
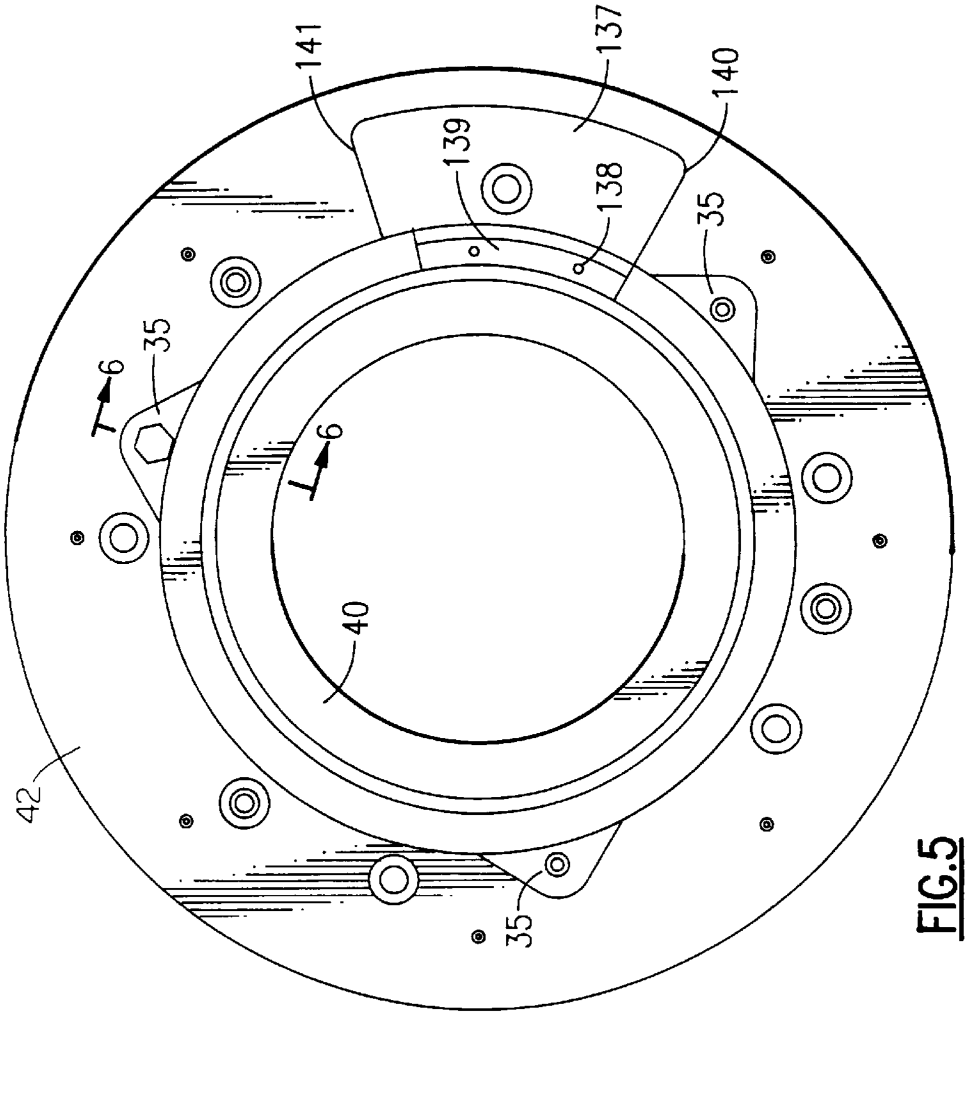
FIG. 5 is a top view of a compressor having a variable diffuser of the present invention.
Figure 8:
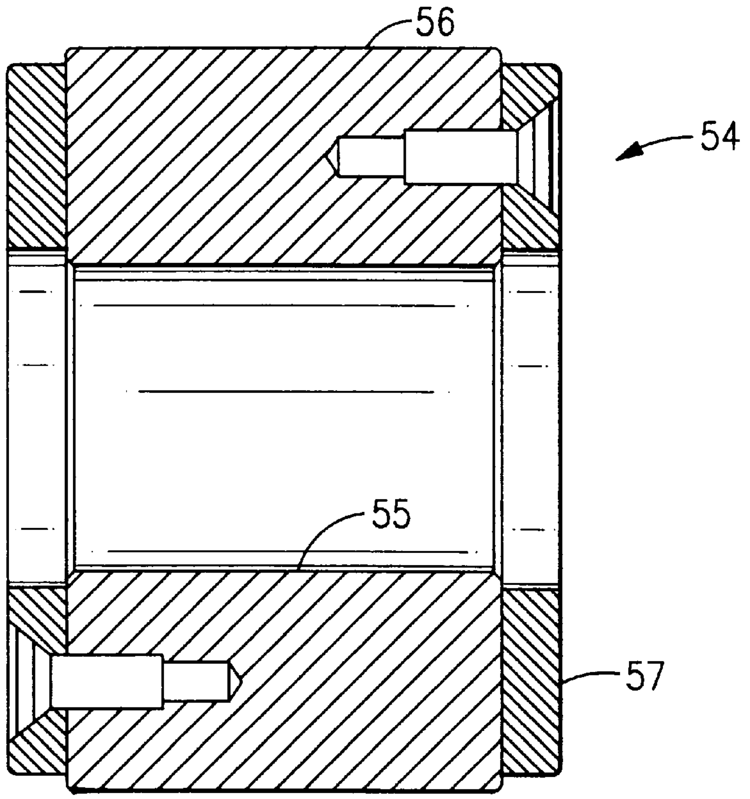
FIG. 8 is a cross section view of a roller assembly of the present invention.
Figure 9:
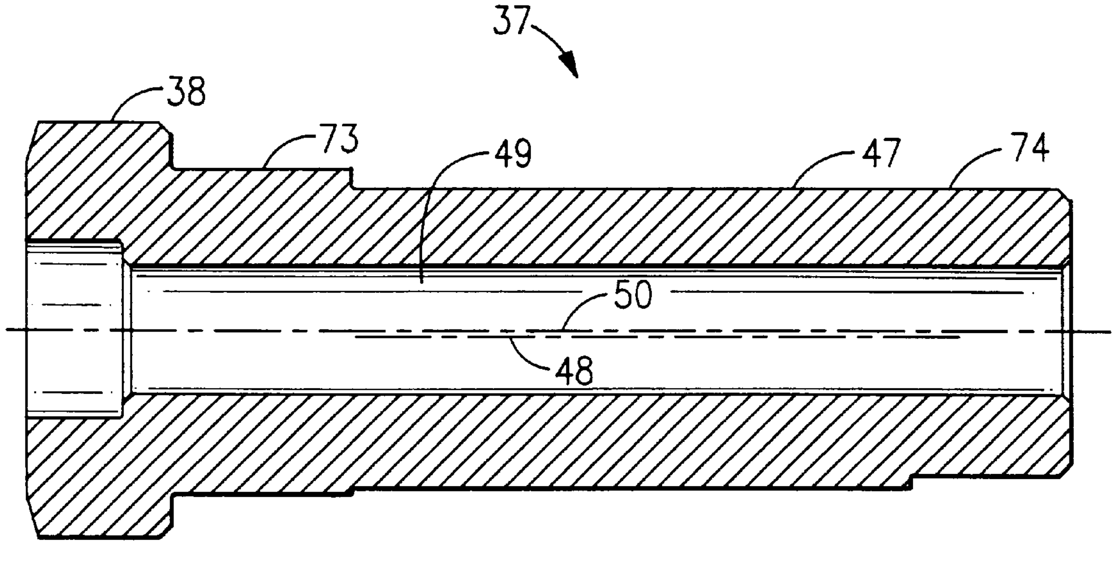
FIG. 9 is a cross section view of an axle of the present invention.

In FIG. 5 a ring support mechanism 35 according to an embodiment of the present invention is shown. The embodiment shown illustrated the use of three such mechanisms spaced circumferentially equidistant about the diffuser. Referring now to FIGS. 6–7 the ring support mechanism of the present invention includes an inner bearing slot 41 and a cutout 43 disposed in inner ring 40, a roller assembly 54, a roller axle assembly 36 and an outer bearing slot 45 disposed in the outer ring. The roller assembly as shown in FIG. 8 includes a roller 55 having an outer bearing surface 56, and a pair of thrust bearing surfaces 57. The axle assembly as shown in FIGS. 6–7 includes an axle 37 and an axle bolt 39. As seen in FIG. 9 axle 37 includes a hex head 38 and an axle body 47, an axle body centerline 48, an axle bore 49 and an axle bore centerline 50. In addition the axle 39 includes a pair of shoulders 73, 74 concentric with axle bore centerline 50.

Another problem with split ring diffusers is premature part wear. Lubricants are generally not used within the gas flow regions of centrifugal compressors to preclude contamination of the gases. The dynamic loads imposed upon the split ring diffuser by the gas flow exiting the impeller cause wear in the components of the diffuser to be accelerated by the absence of lubricating oil. Due to the non-availability of lubricating oils in most compressors it is usually necessary to take steps to minimize friction and fretting wear. Accordingly, in certain embodiments of the present invention and as described herein below, component interfaces are hard coated, parts are manufactured from ultra high molecular weight plastic materials, the ring assemblies are preloaded and backlash is eliminated from the gears of the positioning drive system.

Referring now to the manner in which the inner ring is assembled and its movement. The outer ring 42 is stationary with respect to the suction housing and three sets of ring support mechanisms 35 are installed into the outer ring by positioning the roller assembly 54 within the bearing slot 45 of the outer ring, passing the axle through the mounting hole 58 and the roller assembly and then installing the axle bolt 39 through the axle and loosely threading the axle bolt 39 into threaded holes 59 in the outer ring. The inner ring 40 is installed inside of the outer ring with the cutouts 43 of the inner ring circumferentially aligned with the bearing slot 45 and the roller assemblies 35 and then rotating the inner ring clockwise as shown in FIG. 7 to position the roller assemblies within the bearing slot 41. With the inner ring installed within the outer ring the ring support mechanisms are employed to properly center and position the inner ring by rotating the axle through the use of a wrench placed on the hex head 38. The axle body centerline 48, on which the roller 55 is mounted is offset from axle bore centerline 50, which is concentric with the shoulders 73, 74, by 0.021 inches. The rotation of hex head 38 causes the roller assembly to rotate about the shoulders within the outer ring and causes the roller assembly to be radially displaced relative to the outer ring. Once the inner ring is properly centered within the outer ring the hex head is further rotated to preload the outer bearing surface 56 of the roller assemblies against the inner ring. The axle bolt 39 is then tightened. The preload conditioned is preferred because it prevents the inner ring from movement due to tangential and circumferential loads. In an embodiment of the present invention the roller 55 and the inner ring 40 are aluminum and both the outer bearing surface 56 and the inner bearing slot 41 are hardened to prevent wear. The roller assemblies restrain movement of the rings in the axial direction due to thrust loads by positioning the thrust bearing surfaces 57 within the hardened inner bearing slot 41 and the relatively soft outer bearing slot 45. The thrust bearing surface 57 of the roller assembly must allow for the rotation of the inner and outer rings and at the same time withstand the thrust loads produced by the compressor. In a preferred embodiment the thrust bearing surface 57 is manufactured from ultra high molecular weight plastic having a low coefficient of friction of 0.16 and a hardness of 64 on the Shore D scale. The plastic thrust bearing surfaces prevent contact between the hardened roller and the soft outer bearing slot and are utilized to carry the thrust loads of the compressor and to adjust axial tolerances of the inner ring. An additional feature of the ring support mechanisms is that with the rings assembled as described above it is possible pre-assemble the inner and outer rings and transport them to the compressor for finally assembly.

Figure 16:
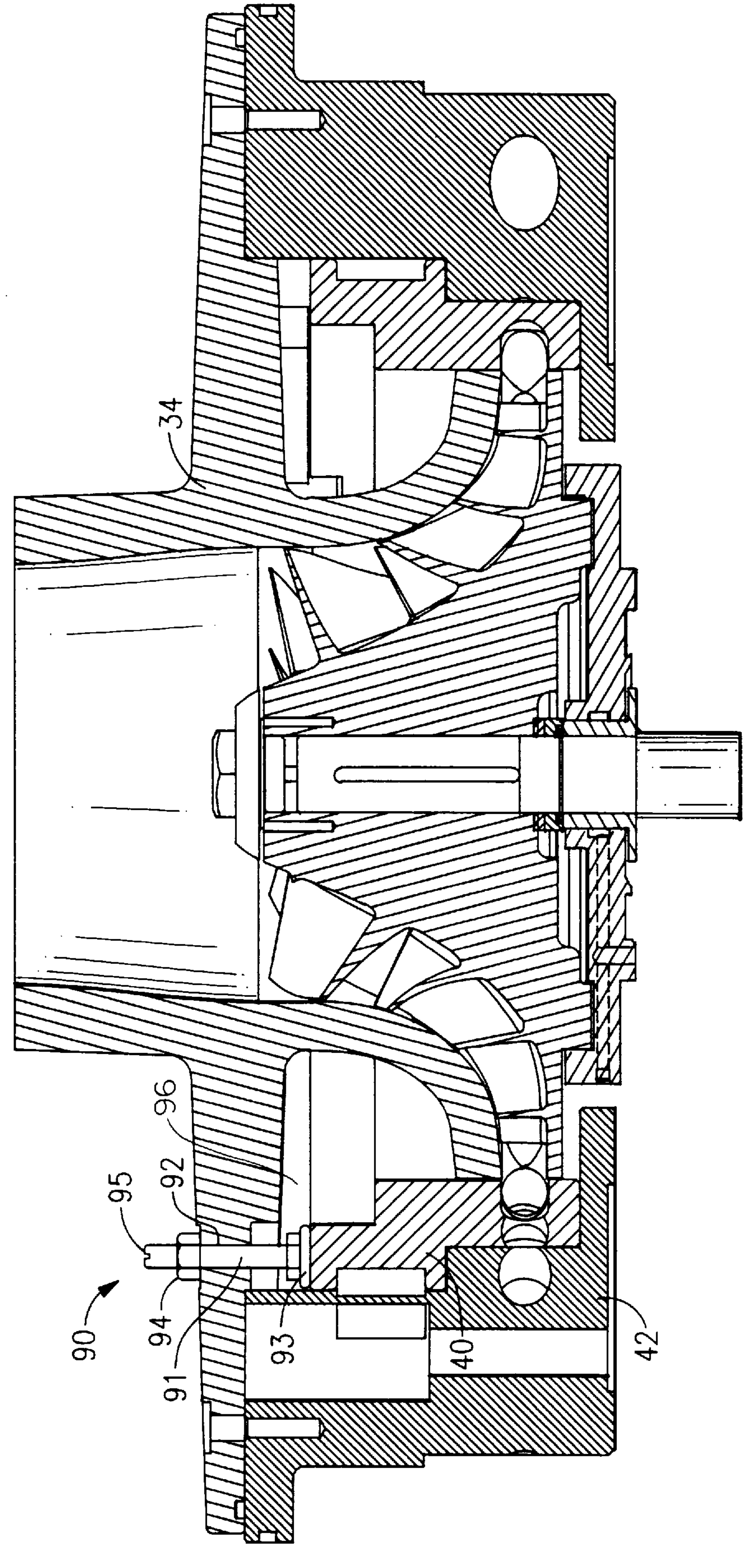
FIG. 16 is a cross sectional view of a compressor having an axial restraint mechanism according to the present invention.

Another embodiment of the present invention for limiting and precluding axial movement of the inner ring relative to the outer ring is shown in FIG. 16. There is shown an axial restraint system 90 comprising a threaded shaft 91, a threaded mounting hole 92, a bearing pad 93, a lock nut 94, a hex head 95, and a recess 96. During assembly of the diffuser the axial restraint mechanism 90 is installed such that the bearing pad 93 is positioned in the recess 96. The bearing pad positioned within the recess allows clearance for the shroud 34 to be mounted to outer ring 42 without accidental contact of the bearing pads with the inner ring. Once housing 34 is installed the threaded shaft 91 is rotated to bring the bearing pad in contact with the inner ring. With the bearing pad properly positioned the mechanism is releasably fastened by tightening lock nut 94. In a preferred embodiment the bearing pad is manufacture from an ultra high molecular weight plastic material. An embodiment of the present invention includes six such axial restraint mechanisms positioned circumferentially equally spaced about the inner ring.

Figure 11:
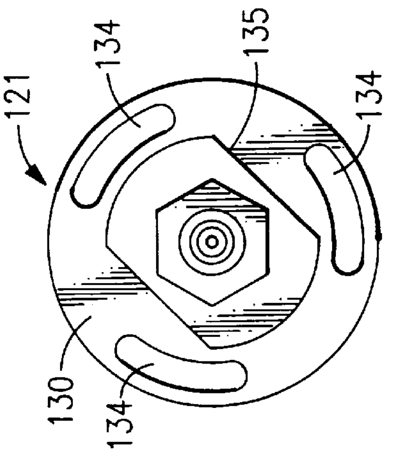
FIG. 11 is a top view of a positioning drive mechanism of the present invention.
Figure 10:
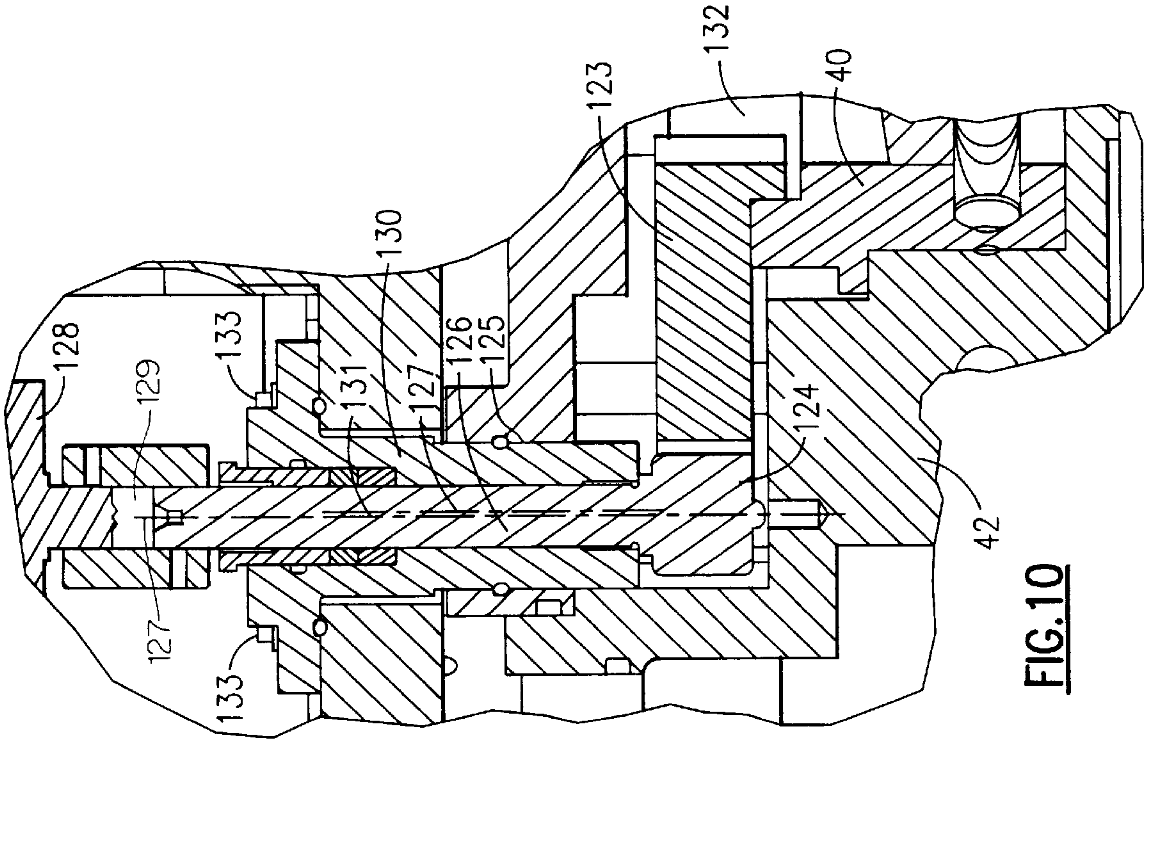
FIG. 10 is a cross sectional view of a positioning drive mechanism of the present invention of detail area 10 in FIG. 1.
Figure 13:
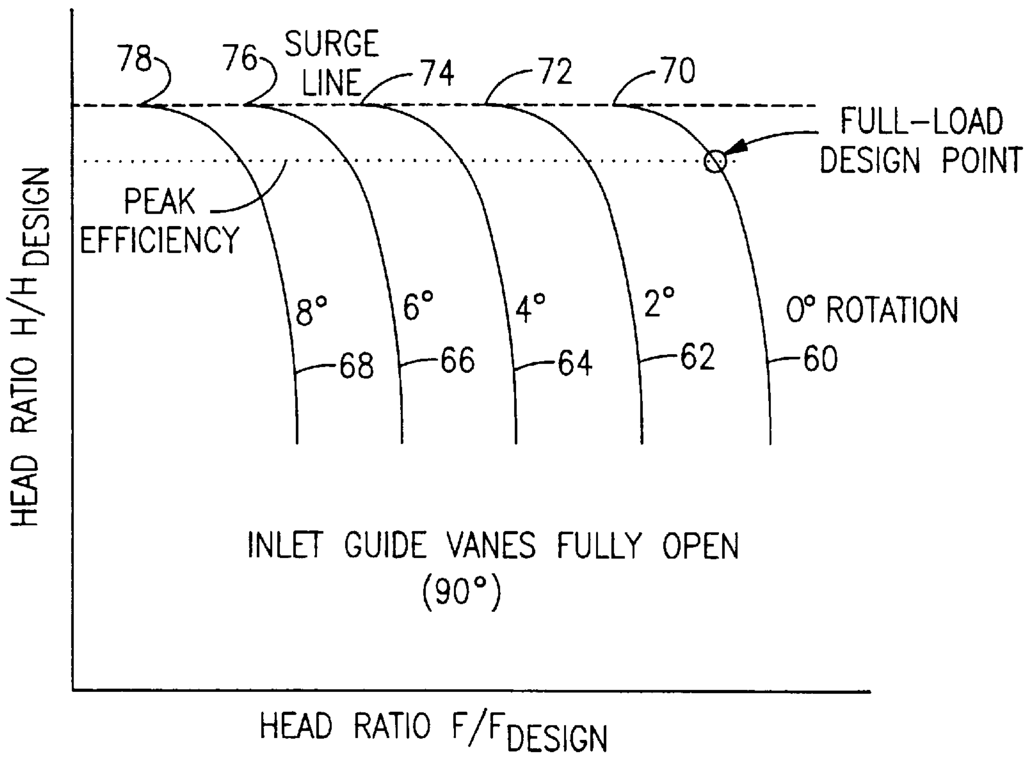
FIG. 13 is a performance diagram for a variable pipe diffuser according to the present invention.
Figure 14:
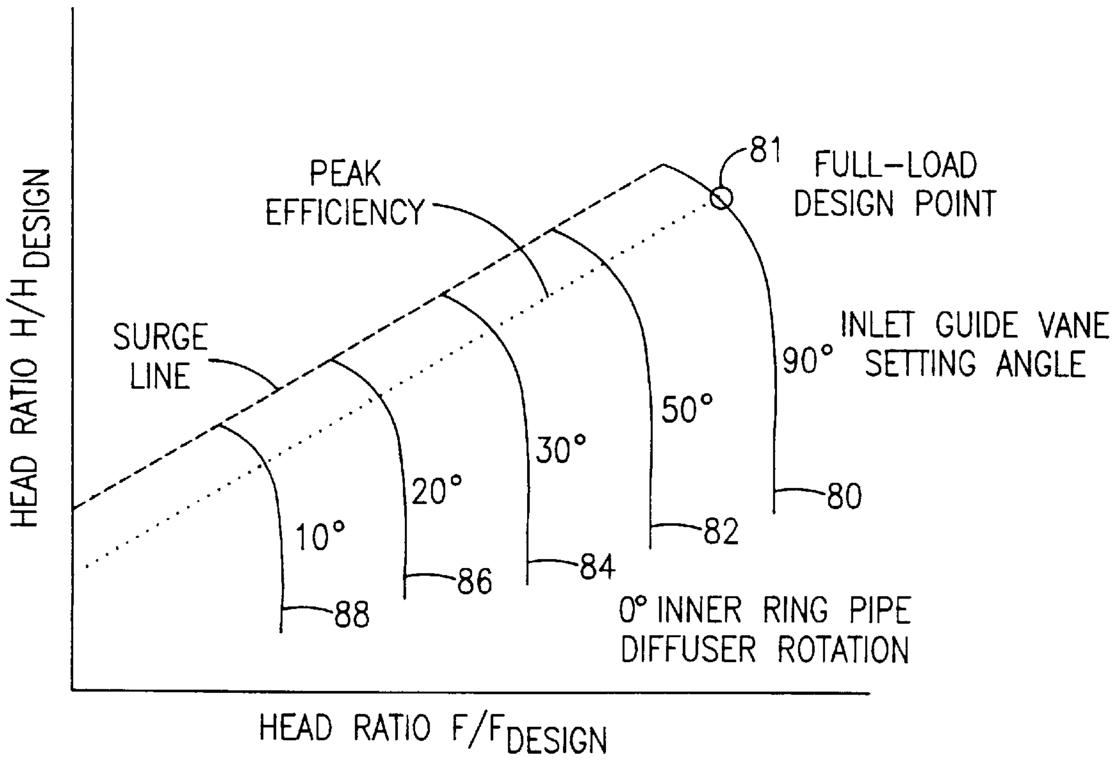
FIG. 14 is a performance diagram for a compressor having inlet guide vanes only.
Figure 15:
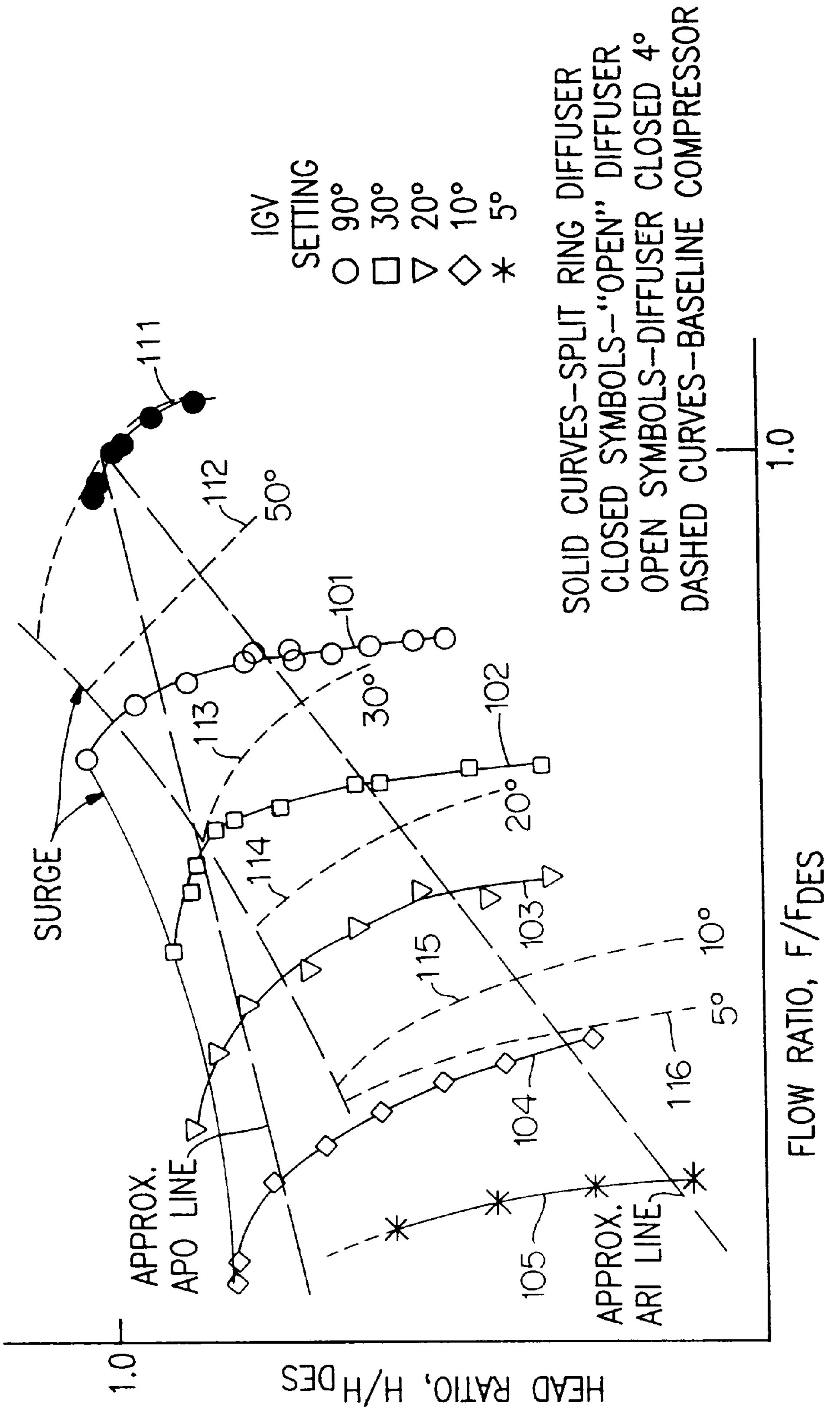
FIG. 15 is a performance diagram for a compressor according to the present invention having a variable pipe diffuser and inlet guide vanes.

A positioning drive mechanism 121 for rotating inner ring 40 circumferentially within outer ring 42 is described with reference FIG. 10. Outer ring 42 has fixedly attached thereto rack gear 123 which extends radially outwardly from outer ring 42. In gearing relation with rack gear 123 is pinion gear 124 which is driven via pinion axle 126 by actuator 128. Actuator 128 is selected and controlled to effect movement of inner ring 40 in relation to outer ring 42 between a first fully open position and a second partially closed position and any number of intermediate positions therebetween. Axle 126 is housed in a containment housing 130 which hermetically seals axle 126 from compressor interior 132 and which prevents leakage of fluid out of compressor 10 through containment housing 130. The tangential and circumferential loading on the rings by the refrigerant flow within the diffuser causes the inner ring to have the propensity to chatter back and forth within the outer ring. Excess movement or chattering of the inner ring would cause the rack gear 123 and the pinion gear 124 to fret and also cause other parts to wear. Preloading the inner ring via the roller assemblies as discussed herein earlier prevents movement of the inner ring as well as chattering under normal operating conditions. In cases of abnormal conditions, such as operating in a surge, a secondary mechanism is needed to prevent motion of the inner ring. The present invention provides for a drive mounting system to prohibit adverse movement and chattering of the inner ring by preventing the backlash between the segment gear and the pinion gear via adjustment of the relative center positions of the pinion gear and the rack gear utilizing the axle containment housing 130. The axle housing outer surface 125 is concentric about housing centerline 127 and housing bore 129 is concentric about housing bore centerline 131. In an embodiment of the present invention the housing centerline 127 and the housing bore centerline 129 are offset by 0.060 inches. Referring to FIG. 11 there is shown wrench flats 135 and adjustment slots 134 of the positioning drive mechanism. After installation of the positioning drive mechanism into the suction housing 31 the backlash between the rack gear 123 and the pinion gear 124 is removed by rotating the drive positioning mechanism by placing a wrench (not shown) across wrench flats 135. Once minimal backlash is achieved the positioning drive mechanism is fixed in place by the tightening of cap screws 133. Once the backlash is eliminated the tendency for the inner ring to move is discharged directly by the actuator through the gear system.

The flow of fluid through diffuser 14 in a second partially closed position in relation to the fully open position flow rate is determined by the ratio of the minimum cross-sectional area of a flow channel of a diffuser in a partially closed position to the minimum cross-sectional area of a flow channel (defined by complementary channel sections 44 and 46) in a fully open position. This minimum flow channel area, known as the "throat area" will generally be determined by the smallest diameter of the flow passage 52 of the inner ring channel 44 when diffuser 14 is in a fully open position, and will be controlled by the width 53 at the interface between the inner and outer rings 40 and 42 when diffuser 14 is in a second partially closed position. For example, if a diffuser channel has a minimum area (throat area) of ⅛ sq. in. in a second partially closed position, and a minimum area (throat area) of ¼ sq. in. in a fully open position then the volumetric flow rate of fluid through a diffuser in the partially closed position will be about 50% of the flow rate as in the fully open position. The flow rate of fluid through compressor 10 when diffuser 14 is in a second, partially closed position, will generally be between about 10% and 100% of the flow rate of fluid through compressor 10 when diffuser is in the first fully open position.

In a second partially closed position (FIG. 4), at least about 10% the volume of flow as in the fully open position should flow through diffuser 14 so as to prevent excessive thermodynamic heating, excessive noise and a degradation in the efficiency of the compressor. To this end, the amount of relative rotation between the two ring sections should be limited to an amount of rotation necessary to effect a second partially closed position. In other words, the rings should not be adjustable to completely close off a flow of fluid therebetween. The degree of allowable rotation between the two rings is determined by the desired flow between the rings in a fully closed position, and the number and volume of inlet flow channel sections 44, 46 in the ring sections 40 and 42 in relation to the volume of the ring sections 40 and 42.

Continuing with reference to FIG. 4, $R_2$ defines the radius of the impeller tip, $R_3$ defines the outside radius of inner ring 40, and $R_4$ defines the outside radius of outer ring. By making the thickness, defined by the Quantity $T=R_3-R_2$ of inner ring 40 no larger than is necessary to block a desired portion (e.g. 50% of flow) of flow through outer ring channels 46, the flow of fluid through diffuser 14 can be efficiently controlled. Rotation of the inner ring with respect to the outer ring will reduce the diffuser throat area before any diffusion has taken place, thus preventing flow acceleration after diffusion. Also, the smaller the inner ring thickness, T, the smaller the turning angles of the flow through diffuser in the partially closed position. Both of the above-described effects tend to improve compressor efficiency under part-load operating conditions.

Figure 12:
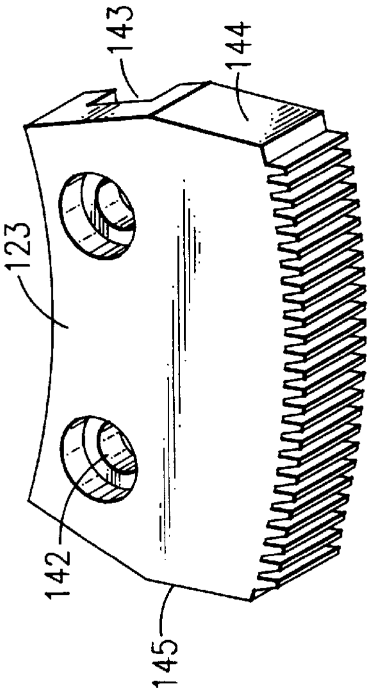
FIG. 12 is a perspective view of a rack gear of the present invention.

Referring now to FIGS. 5 and 12 an embodiment of the present invention is shown having a mechanism to provide positive positioning of the inner ring corresponding to a first fully open position and a second partially closed position. Cavity 137 is machined in outer ring 42 to accommodate rack gear 123. Rack gear 123 is accurately mounted to inner ring 40 in a tongue and groove fashion wherein the rack gear is provided with a circumferential groove 143 adapted to receive tongue section 139 of inner ring 40. To determine the fully opened position the inner ring is positioned within the outer ring and the rings are rotated relative to one another until flow passages 52 are fully aligned with outer flow channels 46. With the rings in this position, and the ring support mechanism adjusted as described herein above, the rack gear is mounted to the inner ring with gear face 145 in contact with full open stop 140 of cavity 137. Bolts (not shown) are then installed through gear mounting holes 142 and securely and tightened into threaded holes 138 in the inner ring. The rack gear and the cavity are sized to provide for a predetermined amount of closure of the pipe diffuser. For example in an embodiment of the present invention a is sized such that difference between the rack gear angular width and the cavity provide for a 10% open position. In this example the required travel of the rack gear is 10 degrees, the rack gear angular width is 35 degrees and the corresponding cavity angular width is 45 degrees. With the rack gear thusly positioned a positive stop is created between the rack gear and the cavity to accurately and repeatably position the rings at points corresponding to a fully open position and a partially closed position. The positive stops also allow for field retrofit of actuator 128 without the need to adjust the position of the inner and outer rings.

Operation and use of the present invention can be understood with reference to FIG. 5 showing a performance diagram for a compressor having a variable pipe diffuser according to the invention integrated therein. The performance diagram of FIG. 5, includes a plurality of performance plots 60, 62, 64, 66 and 68, each corresponding to a discreet positioning between inner and outer ring sections 40 and 42. Each performance plot, e.g. 60, is characterized by a surge point, e.g. 70, which is the point of maximum available pressure. Operating a compressor at a flow rate at or below the surge point will likely result in a surge condition, as discussed in the Background of the Invention section herein.

For purposes of illustrating the invention, plot 60 may correspond, for example, to a first, fully open position, plot 62 may correspond to an intermediate 2 degree partially closed position, plot 64 may correspond to an intermediate 4 degree partially closed position, and plot 68 may correspond to a maximum 8 degree partially closed position.

It is seen that adjusting ring sections 40 and 42 toward a closed position has the effect of adjusting the surge point e.g. 70, 72 in a performance plot for a compressor toward a lower flow rate. Thus, a surge Condition can be avoided during periods of low flow demand by adjusting diffuser rings 40 and 42 toward a closed position.

It is helpful to understanding the invention to compare performance diagram of FIG. 5, for a compressor having a variable diffuser to the performance diagram shown in FIG. 6 corresponding to a compressor having adjustable inlet guide vanes only. In FIG. 6, plots 80, 82, 84, and 86 and 88 correspond to discreet positioning of guide vanes 33 in increasingly closed positions. It is seen that closing guide vanes 33, like the closing of diffuser ring sections 40 and 42 has the effect of lowering the surge point flow rate. Thus, a surge condition can often be avoided by adjusting inlet guide vanes 33 toward a closed position.

However, it is seen from the performance diagram of FIG. 6 that adjusting guide vanes 33 toward a closed position has the further effect of lowering the head pressure available from compressor 10 at the surge point. Hence, a low flow rate operating condition requiring a relatively high pressure cannot be satisfied by adjusting guide vanes 33 alone.

By contrast, it is seen from the performance diagram of FIG. 5 that surge point pressure available from compressor 10 remains essentially stable when diffuser rings 40 and 42 are adjusted toward a closed position. Hence an operating condition requiring a low flow rate and high compressor pressure can be satisfied by adjusting diffuser rings 40 and 42 toward a closed position.

An operating condition requiring a low flow rate and a high pressure ratio relative to the full load operating pressure ratio (e.g. 90% of full load) is common in the case where there is a large difference (e.g. about 50° F. or more) between the ambient air temperature and indoor temperature, but occasional light loading in a building being cooled. In such a situation, a relatively high compressor pressure ratio (e.g. above about 2.5) is required by the refrigerant saturation pressures corresponding to the condenser, and evaporation temperatures, but only a reduced flow rate e.g. 25% of full load is needed to remove the heat generated within the building.

FIG. 7 shows a performance diagram for a compressor having both adjustable guide vanes and a variable pipe diffuser in accordance with the invention. It is seen that efficiency of a compressor can often be optimized by combining an adjustment of guide vanes 33 with an adjustment of diffuser rings 40 and 42. With reference to FIG. 7 dash curves 111, 112, 113, 114, 115, and 116 show performance plots for a compressor having a variable diffuser in a fully open position for various positioning of inlet guide vanes 33, while solid curves 101, 102, 103, 104 and 105 show performance plots for a compressor having partially closed (here, there is about 40% of original flow rate in the closed position) diffuser rings at various guide vane positioning. As is well known to those skilled in the art, a compressor operates at optimum efficiency when operating at the "knee" (e.g. 81 at FIG. 6) of the performance plot characterizing performance of the compressor. With reference to diagram 7, the operating condition requiring, for example, a pressure of about 0.7 maximum, and a flow rate of about 0.3 maximum would be most efficiently satisfied by a compressor operating in accordance with plot 104, realized by adjusting diffuser rings 40 and 42 to a closed position and by adjusting guide vanes 33 to a 10 degree position.

While the present invention has been explained with reference to a number of specific embodiments, it will be understood that the spirit and scope of the present invention should be determined with reference to the appended claims.

What is claimed is:

1. In a centrifugal compressor having an annular radially disposed split ring diffuser, the diffuser including an inner ring having an upper surface, an outer ring, and a housing fixedly attached to the outer ring, an axial restraint system comprising:

the housing having a mounting hole disposed therein in perpendicular arrangement to the inner ring;

a shaft having a first end and a second end;

a bearing pad mounted to the first end of the shaft;

the second end of the shaft threadably engaged in the mounting hole and rotatably operable to effect an adjustment of the position of the bearing pad; and the shaft positioned such that the bearing pad contacts the upper surface of the inner ring and thereby limiting axial movement of the inner ring relative to the outer ring.

2. The axial restraint system set forth in claim 1, wherein the second end of the shaft includes an area adapted to engage a wrench.

3. The axial restraint system set forth in claim 1, wherein the shaft includes a lock nut for releasably securing the shaft at a selected adjustment position.

4. The axial restraint system set forth in claim 1, wherein there are a plurality of shafts and bearing pads disposed in contact with the inner ring.

5. The axial restraint system set forth in claim 1, wherein the housing includes a recess adapted to receive the bearing pad to preclude contact of the bearing bad with the inner ring during installation housing.

6. A method of limiting axial movement of an inner ring in a centrifugal compressor having an annular radially disposed split ring diffuser, the diffuser including an inner ring having an upper surface, an outer ring, a housing fixedly mounted to the outer ring and having a mounting hole disposed therein in perpendicular arrangement to the inner ring, a shaft having a first end and a second end, a bearing pad mounted to the first end of the shaft, the method comprising the steps of threadably engaging the second end of the shaft in the mounting hole; and rotating the shaft to position the bearing pad in contact with the upper surface of the inner ring.

7. The method set forth in claim 6, wherein the shaft includes a lock nut, the method further comprising the step of rotating the lock nut to releasably secure the shaft at a selected adjustment position.

* * * * *